US 11,392,588 B2

(12) United States Patent
Ganesh et al.

(10) Patent No.: US 11,392,588 B2
(45) Date of Patent: Jul. 19, 2022

(54) ACTIVE QUERIES FILTER EXTRACTION

(75) Inventors: Amit Ganesh, San Jose, CA (US);
Bipul Sinha, Foster City, CA (US);
Srinivas Vemuri, Foster City, CA (US)

(73) Assignee: Oracle International Corporation,
Redwood Shores, CA (US)

( * ) Notice: Subject to any disclaimer, the term of this patent is extended or adjusted under 35 U.S.C. 154(b) by 1354 days.

(21) Appl. No.: 10/866,433

(22) Filed: Jun. 10, 2004

(65) Prior Publication Data

US 2005/0055381 A1     Mar. 10, 2005

Related U.S. Application Data

(60) Provisional application No. 60/500,480, filed on Sep. 4, 2003.

(51) Int. Cl.
*G06F 16/2455* (2019.01)

(52) U.S. Cl.
CPC .. *G06F 16/24552* (2019.01); *G06F 16/24568* (2019.01)

(58) Field of Classification Search
CPC .............. G06F 16/24552; G06F 16/24568
USPC ......................................... 707/3, 740
See application file for complete search history.

(56) References Cited

U.S. PATENT DOCUMENTS

| | | | |
|---|---|---|---|
| 4,991,087 A | 2/1991 | Burkowski et al. | |
| 5,133,075 A * | 7/1992 | Risch | 707/201 |
| 5,471,629 A * | 11/1995 | Risch | 707/687 |
| 5,615,362 A | 3/1997 | Jensen et al. | |
| 5,706,435 A | 1/1998 | Barbara et al. | |
| 5,999,946 A * | 12/1999 | Ballis et al. | 707/201 |
| 6,332,198 B1 * | 12/2001 | Simons et al. | 714/6 |
| 6,341,281 B1 | 1/2002 | MacNicol et al. | |
| 6,374,263 B1 | 4/2002 | Bunger et al. | |
| 6,457,020 B1 | 9/2002 | Carey et al. | |
| 6,466,931 B1 | 10/2002 | Attaluri et al. | |
| 6,625,602 B1 | 9/2003 | Meredith et al. | |
| 6,671,715 B1 * | 12/2003 | Langseth et al. | 709/203 |
| 6,694,306 B1 | 2/2004 | Nishizawa et al. | |
| 6,708,179 B1 * | 3/2004 | Arora | G06F 17/30457 |
| 6,738,762 B1 | 5/2004 | Chen et al. | |
| 7,035,846 B2 | 4/2006 | Gupta et al. | |

(Continued)

OTHER PUBLICATIONS

Gupta, Ashish, and JoséA Blakeley. "Using partial information to update materialized views." Information Systems 20.8 (1995): 641-662. (Year: 1995).*

(Continued)

*Primary Examiner* — Mohsen Almani
(74) *Attorney, Agent, or Firm* — Hickman Becker Bingham Ledesma LLP (57) ABSTRACT

A query result set is an example of a type of body of data whose content is defined by a query. Modifications to a database can change the result of a query and therefore what the content of such a body of data, such as a result set, should be. Active Queries is an approach that enables a database server to detect database changes that alter the result of a query registered for a client and to notify a client of those changes. The notifications may be sent to, for example, a cache manager responsible for maintaining coherency of a result set cache generated by the query. The notification notifies the cache manager of when and/or what changes are needed to maintain the coherency of the cache.

2 Claims, 3 Drawing Sheets

(56) References Cited

U.S. PATENT DOCUMENTS

| | | | |
|---|---|---|---|
| 7,158,966 | B2 | 1/2007 | Brill et al. |
| 7,194,451 | B2 | 3/2007 | Chaudhuri et al. |
| 2002/0001307 | A1* | 1/2002 | Nguyen et al. ............... 370/386 |
| 2002/0035673 | A1 | 3/2002 | Roseborough et al. |
| 2002/0042789 | A1 | 4/2002 | Michalewicz et al. |
| 2002/0169747 | A1 | 11/2002 | Chapman et al. |
| 2004/0064441 | A1* | 4/2004 | Tow .................................. 707/2 |
| 2004/0098413 | A1* | 5/2004 | Peng ............................ 707/200 |
| 2004/0205048 | A1 | 10/2004 | Pizzo et al. |
| 2005/0203878 | A1 | 9/2005 | Brill et al. |
| 2010/0036803 | A1 | 2/2010 | Vemuri et al. |

OTHER PUBLICATIONS

Zaremski et al., "Signiture Matching: A Key to Reuse", Carnegie Mellon University, May 3, 1993, 16 pages.
U.S. Appl. No. 10/866,344, filed Jun. 10, 2004, Notice of allowance, dated Nov. 12, 2010.

\* cited by examiner

ACTIVE QUERIES FILTER EXTRACTION

RELATED APPLICATION

The present application claims priority to U.S. Provisional Application No. 60/500,480, entitled Active Queries and filed on Sep. 4, 2003 by Amit Ganesh, et al., the contents of which are incorporated herein by reference.

FIELD OF THE INVENTION

The present invention relates to database technology, and in particular, techniques that may be used to maintain the coherency of caches of data from a database.

BACKGROUND OF THE INVENTION

In a computer system, one of the most powerful mechanisms used to increase efficient access to data is a cache. A cache is memory that is used to store copies of data items, that are stored in a different memory or another portion of the same physical memory, for access by a computer process. The term memory refers to any resource or medium that may be used to store data, including volatile memory or non-volatile memory, such as a disk drive.

Caches come in many forms and are used in many types of systems. One of the simpler examples of a system that uses a cache is a computer that accesses disk blocks on a disk drive. The volatile memory of the computer is used as a cache for data stored on the disk. Data stored in the computer's volatile memory can be accessed more efficiently than data on a disk. In order to access a disk block on the disk, the disk block is loaded from the disk drive into a portion of volatile memory, where it is accessed multiple times by one or more processes more quickly and efficiently.

The data or data item of which a copy is stored in a cache is referred to as a source data item. The copy of the source item in the cache is referred to as a cache copy. A memory in which the source data for a cache is stored is referred to as source memory. In the above example, the source data is the disk block and the source memory is the disk drive. The copy of the source data item stored in a cache is referred to herein as a cache copy.

A cache can be accessed more efficiently than a source memory for a variety of reasons. For example, a cache could be in a memory composed of a faster medium than the medium of the source memory, as in the above example; a cache could be located in a networked computer's local memory, volatile or non-volatile, while the source memory is in a computer on the network; a cache for a computer can be the memory of a second network linked computer than can be accessed more quickly on the network than a third computer whose memory is the source memory, the network link between the computers may include a wide area network and other computers and/or network devices, each with a cache that holds data from the source memory.

In multi-processing systems, there may be many caches that hold copies for the same set of source data items. For example, in a multi-tiered architecture, in which a server at the first tier stores source data items, caches of numerous server clients at the second tier store cache copies of the source data items. There may be multiple cache copies of a single source data item in multiple caches of the second tier.

The process of managing a cache is referred to herein as cache management. Cache management includes retrieving copies of source data items and storing them in a cache, providing valid cache copies to clients that request copies of a source data item, and maintaining and optimizing the use of the cache. A cache management system includes software modules, which may be comprised of specialized software dedicated to managing one or more caches and may be executed by clients of a cache or servers of the source data, or a combination thereof. The software modules may be executed on multiple computer systems that participate in the cache management of multiple caches.

Clients of a cache rely on the accuracy of data provided to them from the cache, and often assume that data from the cache coheres to the source data, even as the source data undergoes changes and evolves through multiple states. A cache or cache copy coheres to its source data if the cache or cache copy is consistent with the source data according to some logic or set of rules. The condition of one or more caches being coherent with source data is referred to herein as cache coherency. One of the most important and challenging goals of cache management is achieving and managing cache coherency when the source data of a cache is constantly changing and evolving.

The most common approach to managing cache coherency is referred to herein as current coherency. Under current coherency, the rule or logic that governs whether a cache copy is consistent with a source data item is that a cache copy must be identical to the most recent version of the source data item. A cache is managed such that only cache copies that are identical with source data are treated as legitimate and coherent copies. When source data changes, the cache is changed to maintain cache coherency.

For example, a source data item of a cache copy in a cache changes. In response to the change, a cache management system performs cache invalidation to prevent the cache copy of the old version of the source data item from being used as a legitimate copy. The term cache invalidation, or invalidation, is used herein to refer to the process of preventing or restricting cache copies from being treated as coherent copies. This is usually accomplished by removing or replacing cache copies or marking cache copies as incoherent or "dirty", preventing them from being provided to a cache client as a coherent copy of the source data. A coherent cache copy may be loaded into the cache as part of the process of cache invalidation, or in response to a cache miss, i.e. detecting that a cache does not a hold a coherent copy of a requested for data item.

Under a more general approach to cache coherency, a cache copy in a cache is associated with a coherency interval. A coherency interval is an interval for which a cache copy is a coherent copy of its respective source data. A coherency interval is usually associated with a particular version of a source data item.

For example, at time t1 a source data item S has a value v1, at time t2 a value v2, and at time t3 a value v3. A cache copy of S, S1, is associated with the interval bounded by t1 and t2. Another cache copy of S, S2, is associated with a coherency interval bounded by t2 and t3. Yet another cache copy of S, S3, is associated with an undetermined interval bounded by t3 and infinity, an end point of infinity representing that an end point of the coherency interval has not yet been fixed.

Cache clients are associated with a coherency point; the coherency of cache data for the client is based on the coherency point. For example, a client, associated with a coherency point of time t23, requests data from S. Time t23 is between t2 and t3. The coherent cache copy of S is S2, the cache copy whose coherency interval is bounded by t2 and t3. The client requests may be satisfied by data in S2.

The current coherency approach is an instance of the more general coherency approach. Under this approach, the coherency intervals associated with cache copies can be represented by a binary system, in which one binary state represents that a cache copy is coherent, and the other represents that the copy is not coherent.

The boundaries of coherency intervals are not necessarily defined by explicit times, but instead may be defined by events or the states of source data, or a combination thereof. For example, a database server typically applies changes to a database as transactions. The state of a database after applying a transaction (or a set of transactions) is referred to as a consistency state. A database transitions through consistency states as transactions are applied. The consistency states can define the boundaries of coherency intervals.

Cache invalidation under the more general approach to cache coherency involves restricting and/or establishing a boundary of coherency intervals. For example, at time t4, another version of source data item S, S4, is generated. In response, cache invalidation is performed by establishing for S3 a new coherency interval bounded by t3 and t4.

Transaction Processing

Managing cache coherency in a multi-server environment is made more complex because of transaction processing. In transaction processing, changes to a database are applied as transactions in a way that preserves four properties. These properties are referred to as ACID properties, which are defined as follows.

ATOMICITY: A transaction should be done or undone completely and unambiguously.

CONSISTENCY: A transaction should preserve invariant properties (such as integrity constraints) defined on the data. On completion of a successful transaction, the data should evolve from one consistency state to another.

ISOLATION: Each transaction should appear to execute independently of other transactions that may be executing concurrently in the same environment. The effect of executing a set of transactions serially should be the same as that of running them concurrently. This requires during the course of a transaction, that intermediate (possibly inconsistent) state of the data should not be exposed to all other transactions. Consequently, transactions must not be able to see the changes made by concurrently executing transactions until those transactions have been completed as an atomic unit and made persistent, i.e. committed.

DURABILITY: The effects of a completed transaction should always be persistent.

Under transaction processing, the data provided to a client of a database server should conform to ACID properties. To assure data is provided in this way, a snapshot approach is used. Under the snap shot approach, a client of a database server requests data from the database and makes changes to the database as a part of a transaction, herein referred to as the "active transaction". Every version of a data item needed by the active transaction belongs to a "snapshot" of the database associated with the client. As other database transactions are committed, the database goes from one consistency state to another. A snapshot is a view of the database that is based on the particular consistency state (herein referred to as the "snapshot point") that existed when the active transaction commenced, plus any modifications made by the reader transaction. Thus, a snapshot includes all changes that were committed to the database at a snapshot point and any modifications made by the active transaction itself, but no changes made by transactions that were not committed as of the particular consistent state. If no such version of a data item is actually stored anywhere, the version must be derived from an existing version of the data item.

Providing a snapshot requires tracking and generating lots of information. For example, a database server tracks which transactions are currently being executed and the consistency states with which they were associated when commenced, which data blocks have rows changed by which transactions, and generating records for redo and undo logs. Redo logs and undo logs contain information needed to redo changes and undo changes.

To demonstrate how a snapshot is generated, the following example is provided. Assume that a data item DATA1 has been changed by three transactions TXA, TXB, and TXC, in that order. TXA is committed before consistency state T and TXC did not commit until consistency state T+1. Transaction TXB is associated with consistency state T, but has not committed. Because of the property of isolation, no transaction should be able to see the changes made by TXB.

Transaction TXB also wishes to read DATA1. The version of DATA1 that TXB should see should reflect the change made by TXA but not TXC. The current version of DATA1 does not meet this requirement because it reflects changes made not only by TXA but also by TXC. However, the changes made by TXC may be removed from DATA1 to produce a "derived" version of DATA1, which may then be supplied to TXB. The derived version may be generated by applying undo records associated with TXC to the current version.

Assuring cache coherency and ACID compliance in a multi-server environment requires complex processing by and cooperation between database servers, use of very sophisticated protocols, software, and handshaking, as well as extensive network communication between the database servers.

Multi-Tier Database System

One of the problematic areas for cache management is management of caches in the middle tier of a multi-tier database system. A multi-tier database system has a database server in the first tier, one or more computers in the middle tier linked to the database server via a network, and one or more clients in the outer tier.

A client commences a transaction ("client transaction") by issuing a query, via the middle tier, to a database server to request one or more result sets. In response to issuance of the query, the database server generates the result set based on a snapshot. The result set is then stored in a cache in the middle tier. The portion of the memory in the middle tier in which the result set is stored is referred to as the result set cache. When executing the client transaction, data is read from the result set cache and changes made by the client transaction are made to data in the result set cache and to the database. To commit the client transaction, the changes are committed to the database server.

As with any client in a transaction processing system, a client of a result set cache in the middle tier should be provided data from the cache that conforms to ACID properties. Thus, the logic on which the coherency of the result set cache depends is based on ACID properties. There are inconsistencies that arise between data items in the result set cache and the database server that cache invalidation should account for. To illustrate these inconsistencies and the reasons they arise, the following example is provided.

In the example, result sets requested by a client include a result set order set containing records representing an order and a result set order lines set containing records representing order line items of an order. Orders are represented by a table order. Order line items are represented by a table order lines. The products are represented by a table product. Product contains a column product_number representing the product number of an ordered product. Records in order lines set representing the order line items were produced by a query that joined order, order lines, and product. As a result of the join, the records in the result set contain a corresponding column product_number. The result set also contains a record OL1. The order table contains a column number_of_line_items representing the number of line items in the order. A record in order set contains a corresponding column.

During execution of a client transaction, there may be inconsistencies between the result set cache and the database server that arise for several reasons. The inconsistencies fall into one of several categories depending on what caused the inconsistency. The first category is referred to as "committed transaction inconsistencies". This type of inconsistency is caused by transactions, other than the client transaction, that are committed by the database server after the snapshot point of the result set cache. For example, a source data item for the result set cache may have been changed by another transaction committed by the database server after the snapshot point of the result set. Thus, the cache copy of the source data item in the result set cache is incoherent. Referring to the current illustration involving order set and order lines set, assume that after order set is generated, another transaction changes the product_number column in the product table for the row corresponding to record OL1. The other transaction is committed after the result set is generated but before the client transaction is committed on the database server. When the client transaction is later committed, the value of the product_number in record OL1 is not consistent with the corresponding column and row in the product, and therefore the result set cache is not coherent.

The second category of inconsistencies is referred to as "active transaction inconsistencies". These are inconsistencies caused by uncommitted changes made as part of the client transaction. In general, these are changes that should be triggered by the uncommitted change but are not. This may occur, for example, when there is "business" logic on the database server that the database server is configured to execute but the client is not. Referring to the current illustration, a client transaction inserts a row inserted into order lines. The client adds the row to the result set cache and invokes an API ("Application Program Interface") provided by the database server for inserting the row. In response, the database server inserts the row, which causes a trigger to invoke a stored procedure. The stored procedure increments the number of line items column in the corresponding row in order. While the database server is configured to execute this stored procedure, the client is not configured to execute this procedure or similar logic to update the number_of_line_items in order set when inserting a record into order lines set. The result set cache, and in particular, the value of number_of_line_items as stored in the result set cache, is incoherent even before the client transaction is committed.

To maintain cache coherency, both during the execution of a client transaction and after committing a transaction, there is a need to invalidate the incoherent data within a result set cache. Unfortunately, there exists no cache invalidation mechanism that invalidates and/or replaces only incoherent data in the result set caches of a middle tier database system. Development of such a cache invalidation mechanism has been stymied by the difficulty of tracking or detecting when a cache copy in the result set cache becomes incoherent as a result of changes made by a client transaction, both during and after commitment of the transaction. Thus, the conventional approach to making the result set cache coherent is simply to require the client to request regeneration of another result set, which is regenerated by the database server and communicated back to the middle tier, where it is stored in place of the older version of the result set.

Based on the foregoing, there is clearly a need for a mechanism that tracks and identifies what changes need to be made to maintain the coherency of result set caches, and to do so efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for detecting and communicating changes to the result (or value) of a query is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A result set is an example of one type of body of data whose content is defined by a query. Modifications to a database can change the result of a query and therefore what the content of such a body of data, such as a result set, should be. Active Queries is an approach that enables a database server to detect database changes that alter the result of a query registered for a client and to notify a client of those changes. The notifications may be sent to, for example, a cache manager responsible for maintaining coherency of a result set cache generated by the query. The notification notifies the cache manager of when and/or what changes are needed to maintain the coherency of the cache.

Active Queries is illustrated by using them to maintain the coherency of a result set cache. However, an embodiment of the present invention is not limited to this use. Active Queries may be used for other processes that maintain other bodies of data that are defined by queries, such as processes that refresh materialized views. Materialized views are described in, for example, U.S. Pat. No. 6,205,451, entitled Method and Apparatus for Incremental Refresh of Summary Tables in a Database System, filed by William D. Norcott, et al. on May 22, 1998 and issued on Mar. 20, 2001, the contents of which are incorporated by reference herein, and in U.S. application Ser. No. 10/107,106, entitled Incremental Refresh of Materialized Views Containing Rank Function, and Rewrite of Queries Containing Rank or Rownumber or Min/Max Aggregate Functions Using Such A Materialized View, filed by Abhinav Gupta, et al. on Mar. 26, 2002, the contents of which are incorporated herein by reference.

Figure 1:
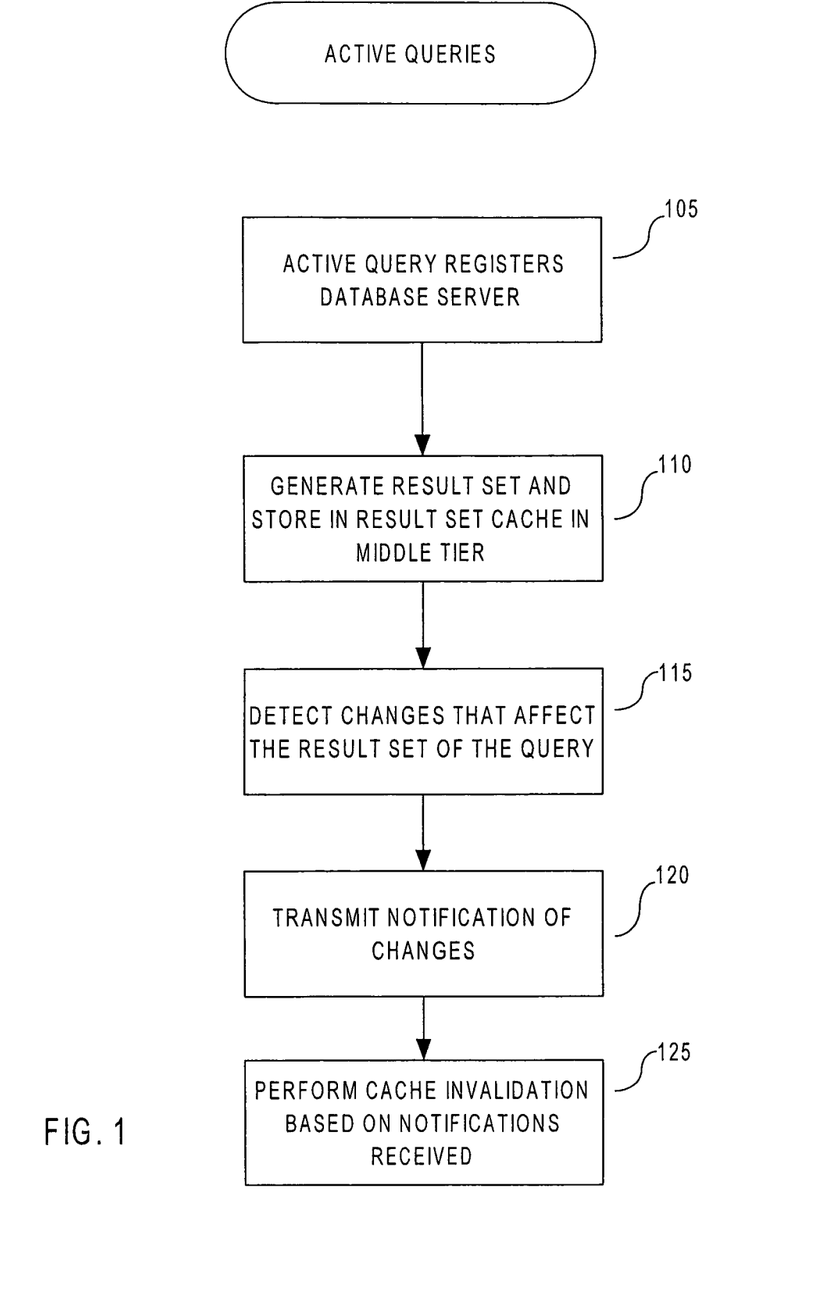
FIG. 1 is a flow chart depicting a process for detecting changes of active queries registered by a database server and for communicating invalidation messages.

FIG. 1 is a block diagram showing a model process for maintaining the cache coherency of a result set in a three-tier database system, such as that previously described, using active queries.

At step 105, a database server registers an "active query" for a database. With respect to registering active queries, the term "register" refers to a database server performing certain operations that will cause the database server to notify a query subscriber of changes to the result of the "active query" caused by modifications made to the database. Such certain operations may include, for example, generating conditions or criteria that a database server uses to determine whether a particular change to a database affects an active query. A database server may register an active query in response to a request from a client and/or subscriber to register the active query.

An active query may have more than one subscriber. Typically, an active query subscriber is a client of a database server. According to an embodiment of the present invention, a query subscriber requests registration of an active query by transmitting the active query as a database statement that substantially conforms to a database language, such as SQL. In addition to specifying query operations and parameters typically specified in a query (such as select-lists columns, from-list tables, and where-clause predicates), the active query contains instructions that identify a query as an active query and that specify how the database server is to notify the client of changes to the active query result set. An exemplary syntax for active queries is described below.

At step 110, a result set is computed for the active query and then stored in a result set cache in the middle tier. Alternatively, no result set is computed.

At step 115, the database server detects changes that affect the result set of the active query. For convenience, an active query is referred to as having changed when the result set computed for the active query changes. The database server can detect changes using various approaches and mechanisms. One such mechanism is to apply criteria to a database change to determine whether the change affects an active query, as is described in greater detail later. Another such mechanism is to poll a registered active query by periodically computing the active query and determining the differences between the results of computations. When and how detection of changes that affect the result of the active query is performed depends on the logic or rules that govern coherency and how invalidation is performed, as is explained in greater detail below.

At step 120, invalidation messages are transmitted to the active query subscribers. Invalidation messages are messages that indicate changes to an active query. They are referred to as invalidation messages because by indicating active query changes, the messages indicate when and what changes to a result set cache are needed to make the result set cache coherent. According to an embodiment, invalidation messages are generated and transmitted to support several forms of invalidation to maintain the coherency of a result set cache according to ACID properties. The timing of when invalidation messages are sent to an active query subscriber is dependent upon whether the source of the change invalidation is another subscriber.

Invalidation Caused By Transactions Committing: Invalidation messages for this type of invalidation are transmitted in response to a transaction committing. Active query subscribers may be orthogonal to the transaction. Subscribers orthogonal to the transaction are subscribers, other than those on whose behalf the committed transaction is being executed. For these orthogonal subscribers, a change made by the transaction, which changes the result set of the subscribed-to active query, does not affect the result set (based on ACID properties) until after the transaction commits. For example, subscriber A and subscriber B are subscribers of active query X. A transaction A, executed for subscriber A, changes the result set of active query X. Based on ACID properties, the result set of subscriber B does not change until transaction X commits. Therefore, the invalidation messages do not have to be sent until transaction X commits.

Invalidation For Active Transactions: Invalidation messages for this type of invalidation are transmitted to resolve active transaction inconsistencies when a transaction makes the change, not when it is committed. This type of inconsistency occurs when a query subscriber is the source of the change, that is, when a transaction of the query subscriber makes a change that changes the result set of the respective active query. Based on ACID principles, the result set changes should "take effect" when changes are made by the transaction, not when the transaction commits. Sending invalidation messages to these query subscribers should be performed with minimal delay after the change is made by the transaction. For example, when a client makes a DML database change ("Data Manipulation Language", such as an insert, update, upsert, delete), the client calls an API method of the database server to make the change. The invalidation message can be returned to the client in the same call, e.g. as part the data returned to client by the call.

In general, invalidation messages should be generated conservatively, that is, an invalidation message is generated for at least every change to the result set of the query. However, some additional "false" invalidation messages may also be generated for data items that have not in fact been changed.

Invalidation messages contain data that indicates that a cache copy of a data item has been changed, and/or may contain a copy of a new version of the data item. Thus, information contained in an invalidation message can be used to identify a cache copy to remove or mark it as dirty, to establish a coherency interval for a cache copy, and/or to provide a copy of a data item with which to replace a cache copy and/or to add a cache copy to the result set cache.

Invalidation messages may be communicated by a database server to a client using various communication mechanisms; the present invention is not limited to any particular communication mechanism. For example, a client may register, with the data base server, a call back routine, method, or procedure, such as a PL/SQL handler. PL/SQL is a database language promulgated by Oracle™ Corporation. A PL/SQL handler is a callback routine written in PL/SQL that is registered with the database server running Oracle database software (e.g. Oracle 10i™). Another mechanism is a messaging system, such as the messaging system described in U.S. application Ser. No. 10/308,924, Asynchronous Information Sharing System, filed on Dec. 2, 2002 by Benny Souder, et al., the contents of which of hereby incorporated herein by reference.

Semantics and Syntax of an Active Query

According to an embodiment of the present invention, an active query has the following syntax.

SELECT ACTIVE_ACTQID, <select-list>
FROM <table-list>
WHERE <query-predicates>
ACTIVE
[HANDLER {<pl/sql handler>}]
[BETWEEN <expression> AND <expression>]
[GUARANTEE];

The ACTIVE Clause:

The ACTIVE clause identifies a query as an active query. This query remains "activated" until it expires or a user sends an explicit request to deactivate the query. During the period of time for which the active query is "activated", the database server sends invalidation messages for changes that occur during that period.

The ACTIVE_ACTQID Pseudo-Column:

This pseudo-column returns the query id of the newly registered Active Query. The database server only allows an active query (i.e. a query with an ACTIVE clause) to specify this pseudo-column in the select list.

The HANDLER Clause:

An optional clause used to specify a PL/SQL handler for transmitting invalidation messages. In the absence of this clause, a database server uses a default communication mechanism for communicating invalidation messages for an active query.

The BETWEEN Clause:

This optional clause is used to specify the active query's life span—the span of time an active query is activated. The lower and the upper bounds indicate the start and expiration time of the active query life span. This interval is fixed at both ends. Clients are only allowed to specify expressions for future times for the lower and the upper bound. If an active query does not contain a BETWEEN clause, a database server activates the active query as soon as the enclosing transaction commits. The enclosing transaction is the transaction within which the active query is issued by the client to the database server.

The GUARANTEE clause:

This clause indicates whether the invalidation is a guaranteed database system service.

An embodiment of the present invention has been illustrated using a syntax for active queries that is substantially similar to that of SQL. However, the present invention is not limited to any particular language or version of SQL, public or proprietary.

Detecting Changes that may Change Active Queries

At a given moment, a database server may be making many database changes and supporting numerous activated active queries. Many of the database changes change active queries. Given the number of database changes that can occur and the number activated active queries that may be supported, the ability to efficiently identify which active queries are changed by a particular database change is an important function.

Database servers are typically configured to make and track database changes at the row level of granularity. For example, when a database server processes a request to make DML database changes to multiple tables, the database server divides the task of making those changes into subtasks, each subtask making the changes to each row of a set of rows in one particular table. The subtasks are then executed by the database server. The changes to the rows are recorded by generating redo records and undo records and storing them in a log. Each redo record contains information needed to redo a DML change to one or more rows; each undo record contains information needed to undo a DML change to one or more rows. Because database servers process DML changes to rows at the row-level of granularity, database servers are more easily configured to detect database changes at the row level of granularity.

According to an embodiment of the present invention, a determination is made of what particular active query is affected by a change to a particular row using "row-level filtering conditions." Row-level filtering conditions are based on the columns and column values of rows from a single table. Such information is readily available to the database server mechanisms that make changes to rows when those changes are made. Thus, row-level filtering conditions allow a determination to be made efficiently using information that is readily available about the change. For convenience, the term filtering condition is used herein to refer to a row-level filter condition, unless otherwise indicated.

Filtering conditions are derived, directly or indirectly, from information contained in an active query and from data to which access is required by computation of an active query. In general, a filter condition is a condition that a row included in the results of an active query satisfies, based on one or more columns of a table. A filter condition can be an expression that requires that a column satisfy some relation (e.g. equality) with a set values explicitly specified by the filter condition. These values are referred to herein as filter condition values. The particular column is referred to as a filter condition column.

Given a database change to a row within a table T, two conditions can be used to determine whether the change caused a change to the result set of a query Q.

(a) whether the before or after versions of the rows satisfy any of the row-level filter conditions for Q, and (b) whether columns changed in the operation belong to the SELECT list of query Q, the changed columns are involved in a JOIN with another table in the next level of hierarchy in the execution of query plan Q, or the modified column is a filter condition column for table T corresponding to query Q.

The following examples are used to illustrate how these conditions may be used to determine whether the change caused the result set of an active query E1 to change. Active query E1 follows:

select c.cid from customer c where c.name='AMIT';

The column c.name is the filter condition column for query E1, c.name='AMIT' is a row-level filter condition that contains the filter condition value 'AMIT', and the select list for E1 is c.cid and the filter condition for customer corresponding to E1 is c.name.

Change 1:Update customer c SET c.addr='xyz' where c.name='AMIT'

The changed row satisfies the row level filter condition for E1, yet does not cause the result set of query E1 to change since the changed column (c.addr) does not appear in the SELECT list and is not a filter condition column for customer.

Change 2:Update customer c set c.cid='1234' where c.name='AMIT'

This change causes a change to the result set of query E1 to change, since the changed row satisfies the row-level filter condition c.name='AMIT', and further, the changed column c.cid appears in the SELECT list of E1.

The following query E2 is provided to illustrate how to determine whether changes affect the result of an active query when an active query contains a join. Query E2 is:
SELECT ACTIVE_ACTQID, c.address, o.oid, ol.olid from customer c, order o, orderline ol WHERE c.name='AMIT' AND c.cid=o.cid AND o.oid=ol.oid ACTIVE The filter condition for CUSTOMER corresponding to this query is c.name='AMIT'. The select and join columns for CUSTOMER are c.address (select column) and c.cid (this JOINS with order).

A row change to customer is determined to affect the result set of Q if
(a) the before or after version of the changed row satisfies the filter condition c.name='AMIT', and
(b) the changed column is either c.address, c.cid, or c.name.

In the case of UPDATE statements, the before and after versions of the changed row are evaluated against the row-level filter conditions. For INSERT statements, the newly inserted row is evaluated against the row-level filter conditions. For DELETE statements, the deleted row is evaluated against the row level filter conditions. To illustrate, the following table Catalog and active query E3 is used.

Catalog(Author_name, book_name, year).Catalog has two rows for 'Crichton'.
('Crichton', 'Jurassic Park', 1997)
('Crichton', 'Dinosaur', 1998)
Query E3:
Select book_name from catalog where Author_name='Crichton' and year='1997'

This query returns a single row ('Jurassic Park'). The row-level filter condition on catalogiscatalog.author_name='Crichton' AND catalog.year=1997;

Change 1: Update catalog set year='1998' where book_name='Jurassic Park'.

Change 1 is determined to change the result set of E3 based on the before version of the row satisfying the filter condition catalog.author_name='Crichton' AND catalog.year='1997'.

Change2:Updatecatalog set year='1997' wherebook_name='Dinosaur'.

Change 2 is determined to change the result set of Query E3 based on the after version of the row satisfying the filter condition catalog.author_name='Crichton' and catalog.year=1997.

Row-Level Filter Condition Extraction

Query E1 is an example of a query that contains all the information needed to generate row-level filtering condition. However, more complex queries, such as query E2, and especially those involving multiple joins, generally do not contain all the information needed to generate row-level filtering conditions.

The fact that query E2 does not, by itself, contain enough information to generate row-level filtering conditions for all tables referenced by query E2 is demonstrated by the following example. Query E2 defines the join predicate c.cid=o.cid. A row in table order that belongs in the results of active query E2 must have a value that belongs to the set of values in O.oid that are equal to a value in c.cid of a row in customer that has a value in c.name equal to 'AMIT'. It is not possible to determine what values belong to that set by examining only information in the active query. In addition to the active query, the tables it references or requires access to must be evaluated to determine the row-level filter conditions for each table, and in particular, the filter condition values needed for the row-level filter conditions. The process of making this computation by examining data in the table is referred herein to as row-level filter condition extraction, or simply filter condition extraction. In general, filter condition extraction involves evaluating an active query and/or data accessed for the query to determine a set of row-level filter conditions and filter condition values that may be used to detect row changes to a table that change an active query.

For example, using query E2 as an illustration, filter condition extraction entails determining a set of columns that may be used for row-level filter conditions for tables referenced in the select-clause. These would include columns referenced in the predicate conditions, such as c.name, o.oid, ol.oid. Next, the column values needed for the filter conditions for customer are determined. Based on the predicate condition c.name='AMIT', the filtering condition for customer is c.name='AMIT'.

Next, the column values needed for filter conditions on order are determined. As mentioned before, whether a row change in order affects active query E2 depends on the row having an o.cid value that belongs to the set of values in c.cid corresponding to rows in customer that have customer.name='AMIT' There are two such rows in customer. The set of values in c.cid for these two rows are values 5 or 6. Thus, the row-level filter condition for table order is o.cid IN (5, 6).

Once generated for an active query and table, filter conditions are used to determine whether a particular change to a database also changes an active query. For example, a row is inserted into order. The value of o.cid for the row is 10. The row does not satisfy the filter condition o.cid IN (5, 6). The change is determined not to affect the active query E2.

Efficiently Storing Conditions

Filter conditions are stored in a filter condition repository. Given that there may be many activated active queries being maintained by a database server, it is important that a filter condition repository is structured so that it can be quickly accessed to efficiently determine what active queries are affected by a particular change. According to an embodiment of the present invention, the filter condition repository is an index, referred to as a filter condition index. The filter condition index indexes filter conditions to active queries.

The filter condition has as index keys a database object id, column id, operator, and value of the column. Database object id and column id are identifiers used by the database server to uniquely identify a database object (e.g. table) and column within the database object. The operator identifies a relational operator (e.g. equality, greater than). Each entry indexes an object id, column id, operator, and value of the column to an active query. When a change is made to a row, the index is scanned to quickly determine which active queries are affected by the change.

Filter Condition Extraction During Query Plan Execution

Typical database servers extract data using a process, referred to herein as query plan execution, which uses components that may be adapted to capture filter condition values. A query execution plan specifies the steps in which a particular type of operation is performed to execute a query. Each step generates as output a set of rows and is therefore referred to as a row source. Each step has as input one or more rows from a row source. A row source may be data generated by another row source. In general, the operations of a row source are carried out by a executing a "row source component" (e.g. a set of software modules, procedures, and/or objects) especially configured to carry out a particular type of query execution step. Execution of a row source generates information that can be used to derive row-level filter conditions. The row source components can be configured to capture this information when executing an execution plan for an active query.

Figure 2:
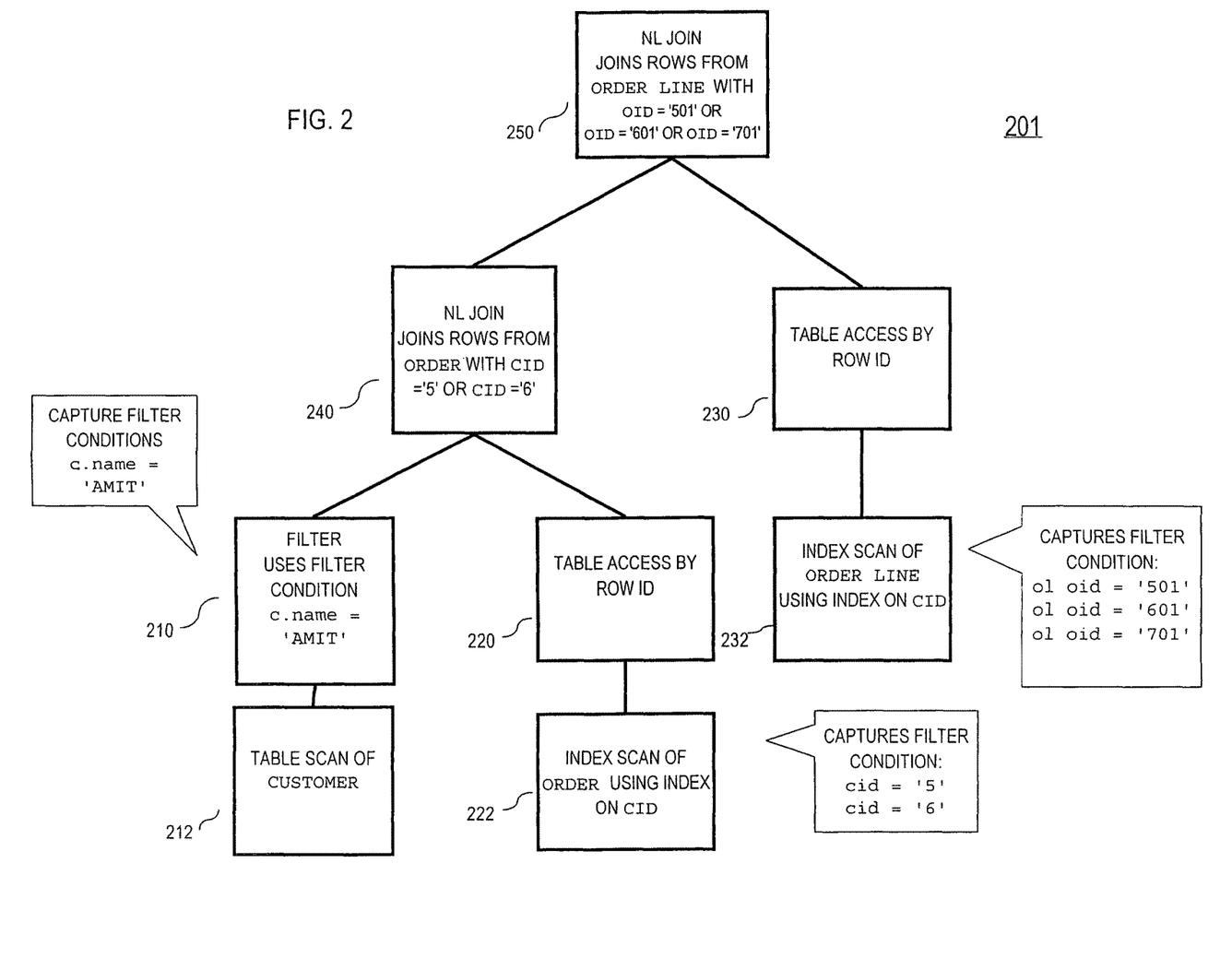
FIG. 2 is a flow chart depicting an execution plan and row sources configured to capture values for conditions used to detect database changes that affect the results of a registered active query.

FIG. 2 shows an exemplary row source tree 201, which is used to demonstrate how execution of a query execution plan for an active query can be used to generate row-level filter conditions. Row source tree 201 represents an execution for active query E2. Row source tree 201 includes nodes that each represent a row source for carrying out a computation of query QE.

Row source 212 accesses customer by performing a table scan. The row source produces rows that are the input to row source 210. Row source 210 applies the filter condition c.name='AMIT' to filter out rows, producing rows that satisfy this filter condition, and that are the input to row source 240.

Row source 240 performs a nested loop join. For each "outer table row" in the "outer table" (i.e. customer), row source 240 finds the rows in the inner table (i.e. order) that satisfy the join condition c.cid=o.cid, and combines these rows with the outer table row. This step is performed by causing the execution of row sources 220 and 222 for each outer table row produced by row source 210. Using the value in c.cid for each outer table row processed by row source 240, row source 222 performs an index scan based on an index on o.cid, using the value in c.cid as a key value. Row source 222 returns row ids of rows in order that have that key value in o.cid. Row source 220 performs a row access by row id to get the row for each row id returned by row source 222. These rows are returned to row source 240, which combines each of the rows with the outer table row.

Row source 250 is also a nested loop join. The outer table for row source 250 are rows produced by row source 240, and the inner table is table order line. For each "outer table row", row source 250 finds the rows in order line that satisfy the join condition o.oid=ol.oid, and combines these rows with the outer table row. This step is performed by causing the execution of row sources 230 and 232 for each outer table row produced by row source 240. Using the value in o.oid for each outer table row processed by row source 240, row source 232 performs an index scan based on an index of ol.oid, using the value in o.oid as the index key value. Row source 232 returns row ids of rows in order line that have that key value in ol.oid. Row source 230 performs a row access by row id to get the row for each row id returned by row source 232. These rows are returned to the row source 250, which combines each of the rows with the outer table row.

A row source tree, such as row source tree 201, is associated with a hierarchy that has multiple levels. A row source that produces rows that are input to another row source in a row source tree is at the next lower level in the hierarchy than that of the other row source. Row source 212 is at the next lower level in the hierarchy than that of row source 240, which is at the next lower hierarchical level than that of row source 240. The "root" node, row source 250, is at the highest level in the hierarchy.

Information that may be used to construct row-level filter conditions may be captured by various row sources depicted in FIG. 2. How this information may be captured is demonstrated by the following illustration, in which active query E2 is registered with a database server. For purposes of illustration, a database component referred to as an active query registrar is executed to register the active query and generate, construct, and/or store filter conditions for the active query. In response to receiving a request to register the active query, the database server executes the query plan depicted by row source 201. As explained in further detail, the row source components of various row sources have been configured to capture filter conditions or filter condition values that may be used to generate filter conditions.

Referring to FIG. 2, row source 210 produces rows from customer that satisfy the predicate c.name="AMIT". Thus rows in the results of query E2 satisfy the filter condition c.name="AMIT". The row source captures the filter predicate as the filter condition, which is supplied to the active query registrar.

Row source 210 produces two rows, having either values 5 and 6 in c.cid. Row source 240 causes the performance of row sources 220 and 222 for each of the two rows. Row source 222 performs two index scans with o.cid as the index key, using in one scan 5 as the key value and one scan with 6. The key values are filter condition values for table order. Row source 222 captures these values, which are provided to the active query registrar.

Row source 220 returns three rows from order, having values in o.oid of either 501, 601, and 701. Row source 240 joins these rows with two outer table rows from table customer, producing three joined rows. These joined rows have either values 501, 601, or 701 in o.oid. The joined rows are input for row source 240.

Row source 250 causes execution of row sources 230 and 232 for each row. Row source 232 performs three index scans with ol.oid as the index key, one with 501 as the key value, one with 601, and one with 701. The key values represent filter condition values for order line. Row source 232 captures these values, which are provided to the active query registrar.

The active query registrar uses information about filter conditions and condition values captured by the row sources. Based on the filter predicate applied by row source 210, the active query registrar determines that all rows from customer in the active query must satisfy the filter condition c.name="AMIT". Based on the index key values captured by row source 222, the active query register determines that all rows from order must have either here the value 5 or 6 in o.cid. Based on the index key values captured by row source 232, the active query registrar determines that all rows from order must have either the value 501, 601, or 701 in ol.cid. From these determinations, the active query registrar generates the following filter conditions, as show in table I.

Finally, it is not necessary to completely execute a query execution plan to extract the information needed to generate filter conditions.

TABLE I

| Table | Filter condition |
| --- | --- |
| customer | c.name = "AMIT" |
| order | o.cid IN (5, 6) |
| order line | ol.oid IN (501, 601, 701) |

Dynamically Maintaining Filter Conditions

Changes made to a database may not only change an active query, but also change the filtering conditions that are used to detect which database change will change an active query in the future. In the current illustration, for example, a new row is inserted into customer that satisfies the filter condition c.name="AMIT". Then new row contains the value 7 in c.cid. Thus, the new row joins with other rows in order having o.cid equal to the 7 and should be in the results of active query E2. To detect that database changes to all rows that could change active query E2 after inserting the new row, the filter condition for order should be changed to o.cid IN (5, 6, 7).

In general, a determination of whether a database change to a table may require a change to the filter conditions for another table is made by: (1) determining whether the inclusion in the active query result of a row from the other table depends on a row in the table changed by the database change, and (2) whether the dependency is based on a filter condition column of the other table. A dependant table is a table whose rows are included in the active query result based on the table changed. The other table is referred to as the primary table. Generally, the dependency between the dependant table and the primary table is based on a column in the dependant table, herein referred to as the dependant column. Identification of a dependant table and dependant column can be made by examining an active query. Thus, a determination of whether a database change may require a change to the filter conditions for an active query is made by identifying a dependant table and a dependant column, and determining whether the dependant column is a filter condition column for the dependant table. Once a dependant table has been identified and the fact that a dependant column is a filter condition column is determined, the database change and the basis of the dependency between the dependant table and primary table is further evaluated to determine what changes should be made to the filter conditions for the active query.

For example, in the current illustration about adding a new row to customer, the database server determines that order is a dependant table and that o.cid is a dependant column and a filter condition column. Therefore, adding the new row to customer may require a change to the filter conditions. The database change and the basis of dependency between the dependant table and primary table is further evaluated to determine what changes should be made to the filter conditions for active query E2. The dependency between rows in customer and order is based on the join condition c.cid=o.cid. Then new row contains the value 7 in c.cid. The new row could therefore join with other rows in order having o.cid equal to the 7. These could therefore be in the results of active query E2. Thus, the filter condition of order should be changed to o.cid IN (5, 6, 7).

Note that order line is also a dependant table and that ol.oid is a dependant column and filter condition column. Therefore, the insert of the new row may require a change to the filter conditions for order line. This database change and the basis of dependency between the dependant table and primary is further evaluated to determine what changes should be made to the filter conditions for the active query. The dependency between customer and order line is based on a join between customer and order and between order and order line, where the join predicates are c.cid=o.cid and o.oid=ol.oid, respectively. Determining what filter conditions should be added depends on evaluating what rows from order are added to the result of active query QE as a result of the insert of the new row into customer, and which rows in order line join with the rows from order that were added to the result. In general, filter conditions may need to be updated recursively, for all tables in an active query, along the hierarchy of the row source tree of the active query.

Hardware Overview

Figure 3:
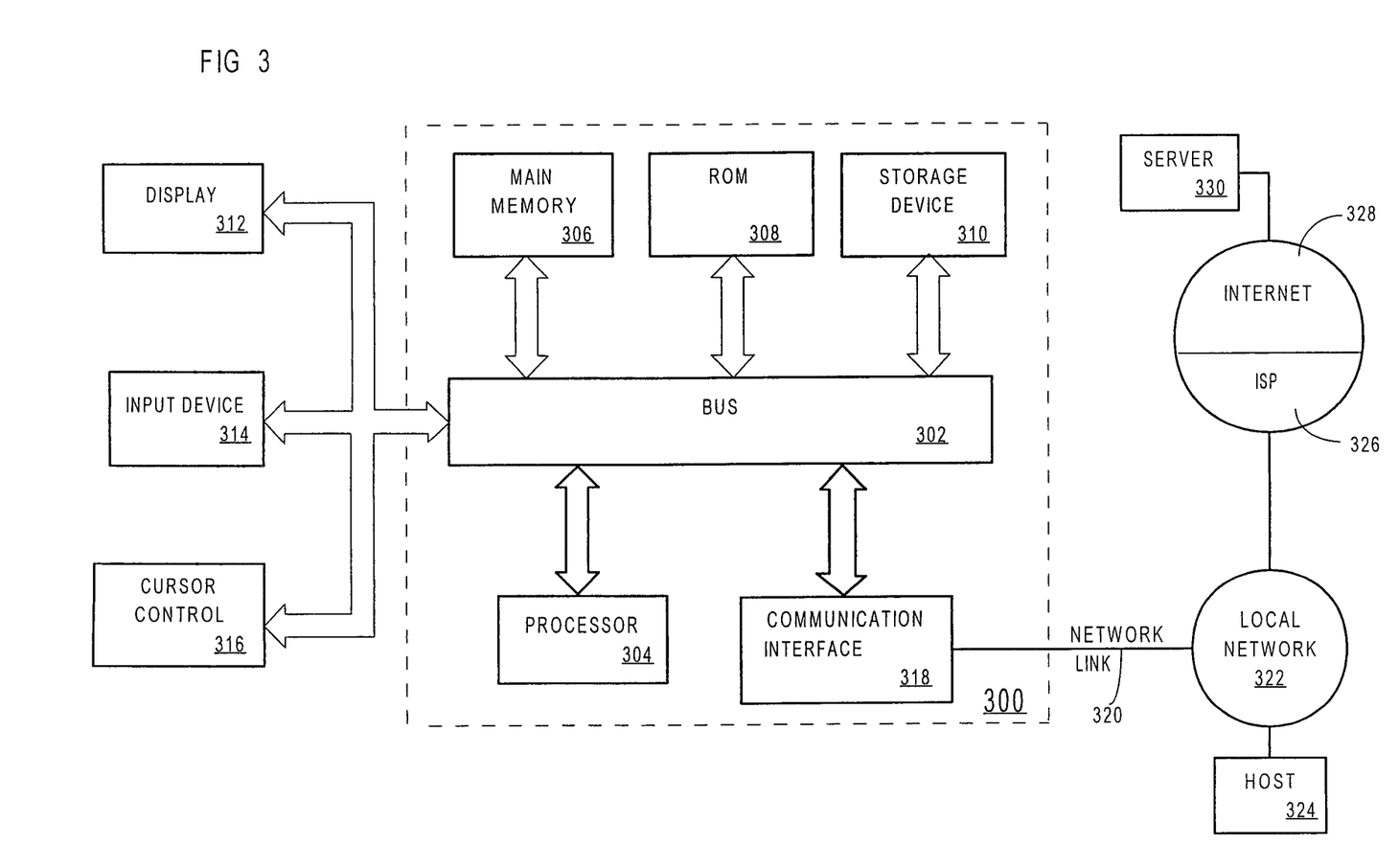
FIG. 3 is a computer diagram depicting a computer which may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for detecting changes to a result of a query expression that may be computed by a database server, comprising:

said database server generating a plurality of filter conditions that are used to detect changes to a database that change the result of the query expression, wherein the query expression specifies a join operation between multiple tables;

wherein said plurality of filter conditions specifies a condition that is based on a column of a database object and that is based on at least one column value for said column, said at least one column value not being explicitly referenced in said query expression;

wherein said plurality of filter conditions includes a first set of one or more filter conditions and a second set of one or more filter conditions;

wherein said first set of one or more filter conditions are based on one or more first columns from a first table of said multiple tables, wherein the first set of one or more filter conditions corresponds to a row source associated with a first level in a hierarchy of a row source tree; and wherein said second set of one or more filter conditions is based on one or more second columns from a second table of said multiple tables, wherein the second one or more columns are joined by said join operation to a corresponding column in said first table;

wherein a row source corresponding to said join operation is associated with a second level in the hierarchy;

wherein said database server generating said plurality of filter conditions includes said database server:

extracting said at least one column value from said column of said database object; and using said at least one column value to form said first set of one or more filter conditions;

detecting a change to said first table; and in response to detecting said change, changing said first set of one or more filter conditions; and wherein changing said first set of one or more filter condition causes recursive changes to one or more filter conditions corresponding to one or more levels higher than said first level.

2. One or more non-transitory storage media storing instructions for detecting changes to a result of a query expression that may be computed by a database server, said instructions, which when executed by one or more computing devices, cause performance of:

said database server generating a plurality of filter conditions that are used to detect changes to a database that change the result of the query expression, wherein the query expression specifies a join operation between multiple tables;

wherein said plurality of filter conditions specifies a condition that is based on a column of a database object and that is based on at least one column value for said column, said at least one column value not being explicitly referenced in said query expression;

wherein said plurality of filter conditions includes a first set of one or more filter conditions and a second set of one or more filter conditions;

wherein said first set of one or more filter conditions are based on one or more first columns from a first table of said multiple tables, wherein the first set of one or more filter conditions correspond to a row source associated with a first level in a hierarchy of a row source tree; and wherein said second set of one or more filter conditions are based on one or more second columns from a second table of said multiple tables, wherein the second one or more columns are joined by said join operation to a corresponding column in said first table;

wherein a row source corresponding to said join operation is associated with a second level in the hierarchy;

wherein said database server generating said plurality of filter conditions includes said database server:
- extracting said at least one column value from said column of said database object; and
- using said at least one column value to form said first set of one or more filter conditions;
- detecting a change to said first table; and
- in response to detecting said change, changing said first set of one or more filter conditions; and
- wherein changing said first set of one or more filter condition causes recursive changes to one or more filter conditions corresponding to one or more levels higher than said first level.

* * * * *

UNITED STATES PATENT AND TRADEMARK OFFICE
CERTIFICATE OF CORRECTION

| | | |
|---|---|---|
| PATENT NO. | : 11,392,588 B2 | Page 1 of 1 |
| APPLICATION NO. | : 10/866433 | |
| DATED | : July 19, 2022 | |
| INVENTOR(S) | : Ganesh et al. | |

It is certified that error appears in the above-identified patent and that said Letters Patent is hereby corrected as shown below:

In the Specification

In Column 11, Line 66, delete "O.oid" and insert -- o.oid --, therefor.

In Column 17, Line 2, delete "punchcards," and insert -- punch cards, --, therefor.

In Column 17, Line 2, delete "papertape," and insert -- paper tape, --, therefor.

In the Claims

In Column 18, Line 41, in Claim 1, delete "levelin" and insert -- level in --, therefor.

Signed and Sealed this
Twenty-seventh Day of December, 2022

Katherine Kelly Vidal
*Director of the United States Patent and Trademark Office*